(12) United States Patent
Valli

(10) Patent No.: US 8,857,605 B2
(45) Date of Patent: Oct. 14, 2014

(54) FEEDER AND POSITIONER FOR DISCRETE ARTICLES, AND SYSTEM FOR SEALING CONTAINERS USING SUCH FEEDER AND POSITIONER

(75) Inventor: Livio Valli, Bergamo (IT)

(73) Assignee: Reepack S.R.L., Seriate (BG) (IT)

( * ) Notice: Subject to any disclaimer, the term of this patent is extended or adjusted under 35 U.S.C. 154(b) by 68 days.

(21) Appl. No.: 13/389,724

(22) PCT Filed: Aug. 10, 2009

(86) PCT No.: PCT/IB2009/006495
§ 371 (c)(1),
(2), (4) Date: Feb. 9, 2012

(87) PCT Pub. No.: WO2011/018674
PCT Pub. Date: Feb. 17, 2011

(65) Prior Publication Data
US 2012/0138424 A1    Jun. 7, 2012

(51) Int. Cl.
| | | |
|---|---|---|
| *B65G 15/10* | (2006.01) | |
| *B65G 21/14* | (2006.01) | |
| *B65G 19/02* | (2006.01) | |
| *B65B 7/16* | (2006.01) | |

(52) U.S. Cl.
CPC ............ *B65G 21/14* (2013.01); *B65B 7/164* (2013.01); *B65G 19/02* (2013.01)
USPC ....................................... 198/817; 198/339.1

(58) Field of Classification Search
USPC ............... 198/817, 418.7, 418.8, 426, 460.2
See application file for complete search history.

(56) References Cited

U.S. PATENT DOCUMENTS

| | | | | |
|---|---|---|---|---|
| 2,387,220 A | | 10/1945 | Wehle | |
| 3,760,553 A | * | 9/1973 | Schmidt et al. .................. | 53/448 |
| 3,830,611 A | * | 8/1974 | Irwin ............................. | 425/144 |
| 4,260,311 A | * | 4/1981 | Hanses ....................... | 414/795.6 |

(Continued)

FOREIGN PATENT DOCUMENTS

| | | | | |
|---|---|---|---|---|
| AU | 4141068 | * | 2/1970 | ............. B65B 57/41 |
| AU | 4141068 A | | 2/1970 | |
| EP | 0104142 A2 | | 3/1984 | |
| RU | 1836216 A | | 8/1993 | |

OTHER PUBLICATIONS

Merriam-Webster Online Dictionary, Jan. 9, 2014, "Disengagement".*

*Primary Examiner* — Ramya Burgess
*Assistant Examiner* — Lester Rushin
(74) *Attorney, Agent, or Firm* — King & Schickli, PLLC

(57) ABSTRACT

The feeder and positioner for trays for food products (209) according to the invention comprises A) at least one conveyor guide (227); B) at least one conveyor chain (211) which for a section further upstream is substantially side-by-side with the at least one conveyor guide, and is designed to engage with a plurality of trays (V) and to make them advance along the at least one conveyor guide (227). At a moving pulley (213) the conveyor chain (211) is substantially diverted from the path of the at least one conveyor guide (227) so as to disengage from the trays (V). The feeder and positioner (209) comprises a slide (223) on which the pulley (213) is mounted. By moving repeatedly, the slide (213) moves the point in which the trays (V) disengage from the chain (211) and deposits a plurality of N trays in a row on the guide (227). The N trays can be picked up simultaneously from the guide (227).

14 Claims, 6 Drawing Sheets

(56) References Cited

U.S. PATENT DOCUMENTS 7,021,450 B2 * 4/2006 Jones, Jr. .................. 198/462.1
2004/0138020 A1 * 7/2004 Meyer ......................... 474/206
2007/0272514 A1 * 11/2007 Hamers et al. ............. 198/369.7
2008/0283364 A1 11/2008 Laganiere

* cited by examiner

FEEDER AND POSITIONER FOR DISCRETE ARTICLES, AND SYSTEM FOR SEALING CONTAINERS USING SUCH FEEDER AND POSITIONER

This application is the national stage of PCT/IB2009/006495, filed Aug. 10, 2009, the full disclosure of which is incorporated herein by reference.

FIELD OF THE INVENTION

The present invention relates to a feeder and positioner for discrete articles, for example usable to feed a sealing unit for trays for food products. The invention also relates to a system for sealing containers, for example trays for food products.

PRIOR ART

Various types of feed systems are currently known for feeding machines that package trays of food products sealed with a film of plastic material. For example, feeding the trays to be sealed to the sealing unit using a continuous conveyor is known. The sealing unit normally comprises a plurality of moulds with several shells, where each shell is designed to receive a tray. In prior art systems, the trays on the conveyor are spaced further apart from one another than the distance between the various shells of the sealing moulds. Therefore, a problem found in this type of machine is the production of feeding and loading systems capable of picking up several trays simultaneously to load them into the sealing mould, moving them closer to one another, before inserting them into the mould.

A first example of a known feeding system which deals with this problem is described in the Italian patent application MI2004A482 and in the corresponding European patent application no EP1577216A1. On the basis of the teachings of the two applications above, feeding systems have been produced comprising (the reference numbers refer to the figures of the applications above):

a first upstream conveyor 6, in turn comprising an endless conveyor chain equipped with "flights", i.e. teeth fixed to the chain which push the trays placed thereon forward;

a second conveyor belt 16;

a third conveyor belt 5;

a stop blade 23, located in proximity of the interface between the second 16 and third conveyor belt 5;

a fourth conveyor 2.

By appropriately extending and retracting, the stop blade 23 prevents or allows passage of the trays 3, so that the trays 3 are loaded onto the third conveyor 5 closer to one another with respect to their position on the first conveyor 6.

When four trays 3 have been loaded on the third conveyor 5, a pusher 12 pushes the trays laterally onto the fourth conveyor 2; therefore, this first system of feeding and loading trays on the one hand has the advantage of allowing several trays at a time to be loaded onto the sealing mould unit 4; on the other hand, the author of the present invention has noticed that the first 6 and the second conveyor 16 advance with continuous movement, while the third 5 and fourth conveyor 2, as well as the pusher 12, advance with intermittent movement, i.e. alternating phases of movement with complete stops, and this can decrease the average working speed of the feeder/loader/sealing unit assembly.

A second example of prior art feeding system, indicated with the overall reference 100 and which deals with the problem of moving the trays closer to one another during transfer from the endless conveyor to the sealing mould, is shown in the accompanying FIG. 1:

the trays to be sealed, not shown, run resting on the longitudinal bars 101 and on the conveyor chains 103; as a result of the flights 105 fixed thereon, the chains 103 feed the trays forward.

When the trays reach the pulleys 107, they are pushed onto the accumulation plate 109 and stop there, as the flights 107 rotating about the pulleys drop below the plate 109 disengaging from the trays. The reference 111 indicates two moving jaws which grasp the trays that have accumulated on the plate 109 and transfer them to the sealing moulds (not shown).

The feeding system 100, and in particular the conveyor chains 103 thereof, operate with continuous movement; however, the system 100 has the disadvantage of not allowing more than two trays to accumulate on the plate 109 before the jaws 111 pick them up; therefore, the jaws 111 can load no more than two trays at a time into the sealing moulds.

An object of the present invention is to provide a system for feeding discrete products, for example trays for food products to be sealed, which allows or facilitates simultaneous pick-up and loading of a plurality of trays—or other discrete products—onto a unit downstream, moving the trays or other discrete products to be picked up closer to one another, and which is an improvement with respect to prior art systems in relation to the disadvantages indicated above.

SUMMARY OF THE INVENTION

This object is achieved, according to the present invention, with a feeder and positioner having the features according to claim 1.

The advantages achievable with the present invention shall be more apparent, to those skilled in the art, by the following detailed description of some particular examples of embodiment provided by way of non-limiting example, illustrated with reference to the following schematic figures.

LIST OF FIGURES

Figure 4:
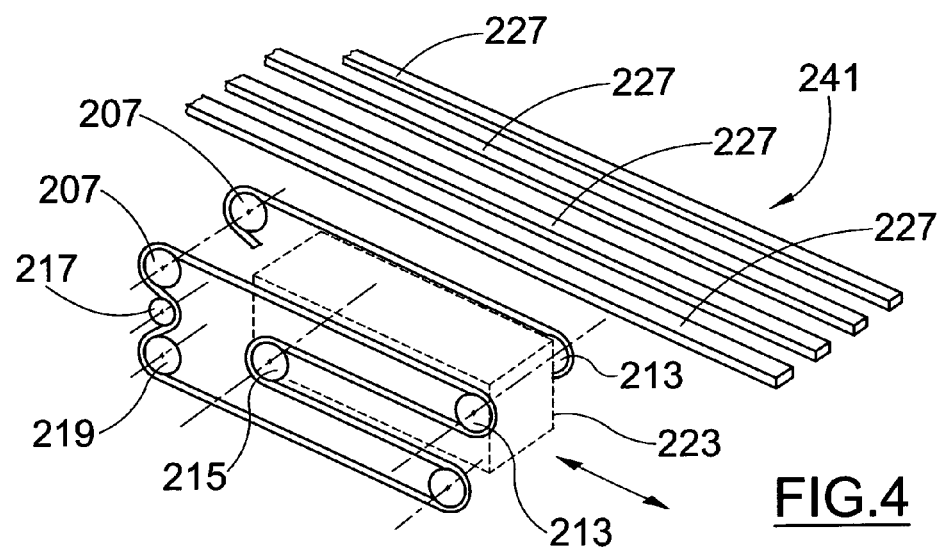
Figure 2:
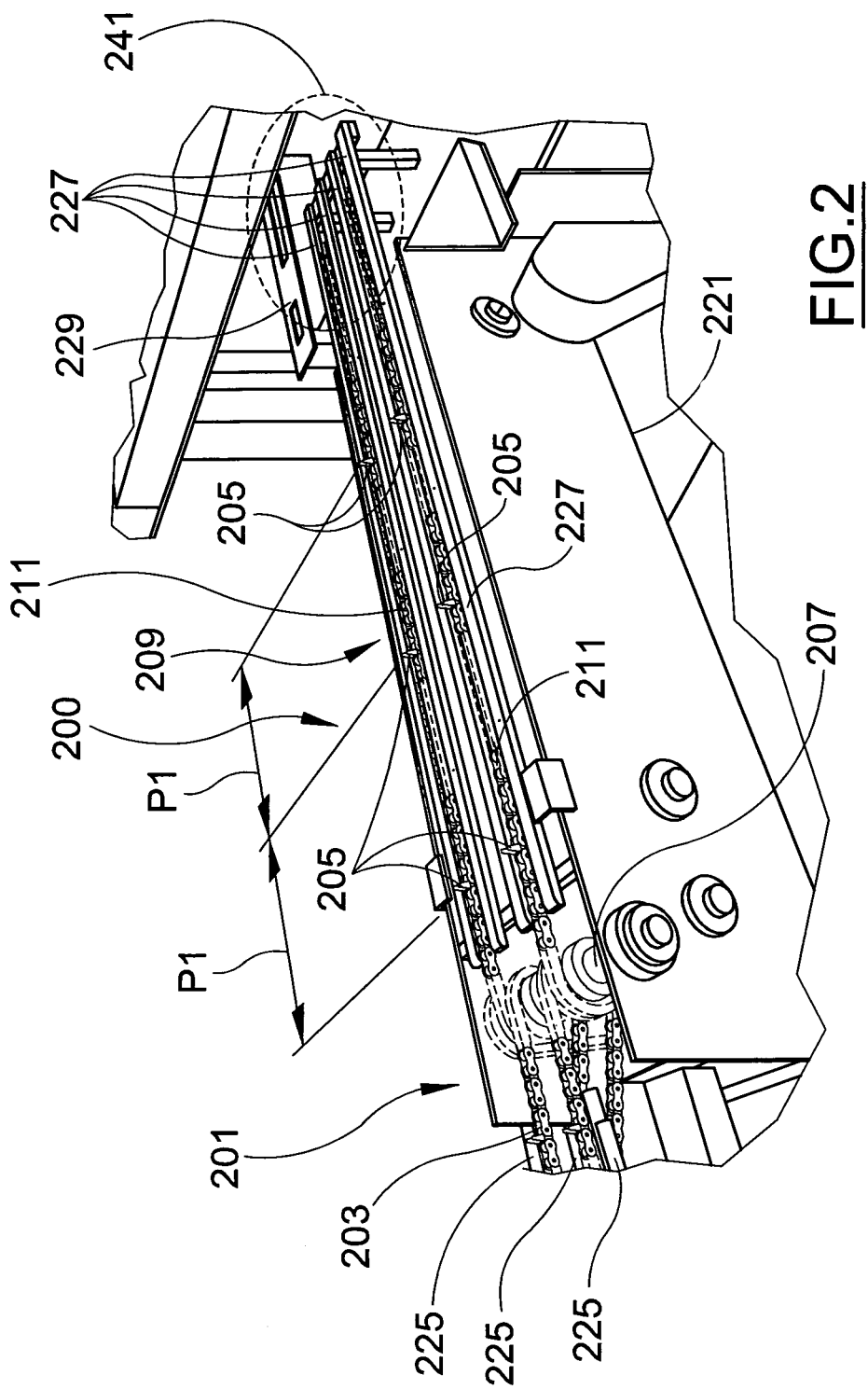
FIG. 2 shows a perspective view of a feeder and positioner according to a first embodiment of the present invention.
Figure 3:
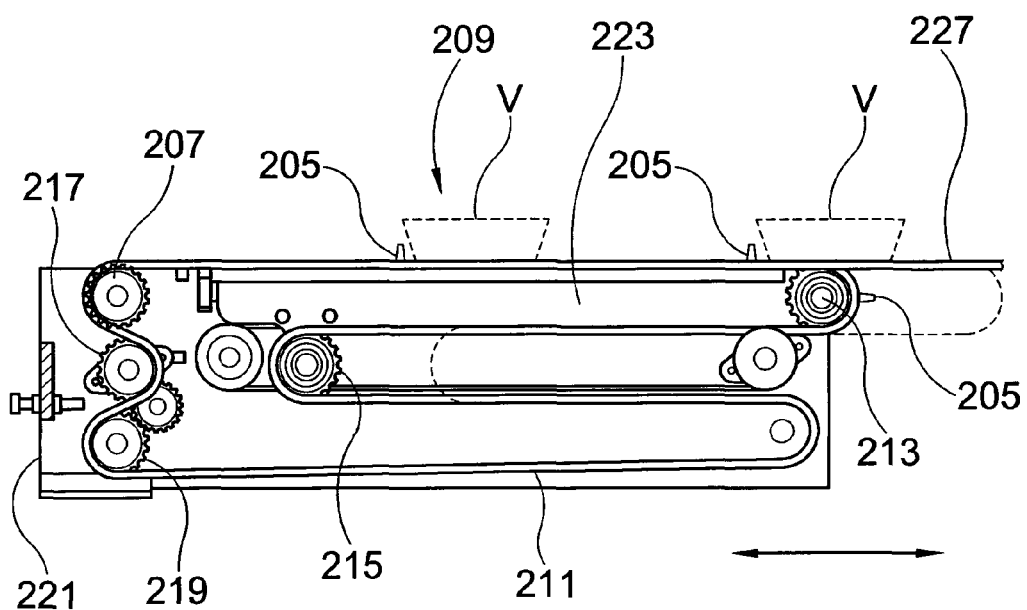
Figure 6:
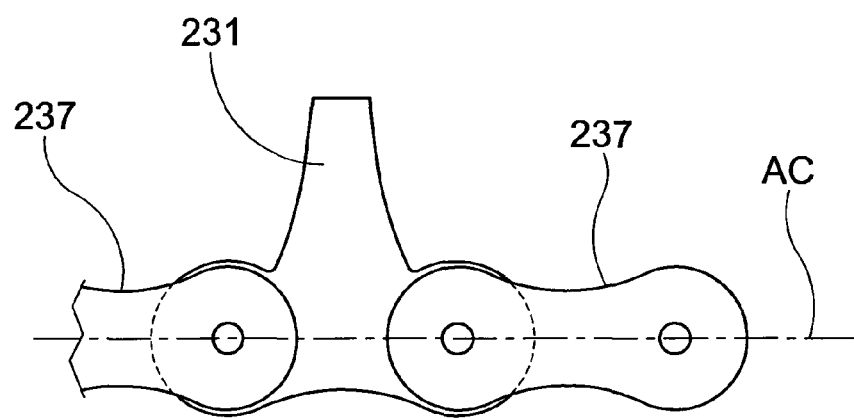
Figure 7:
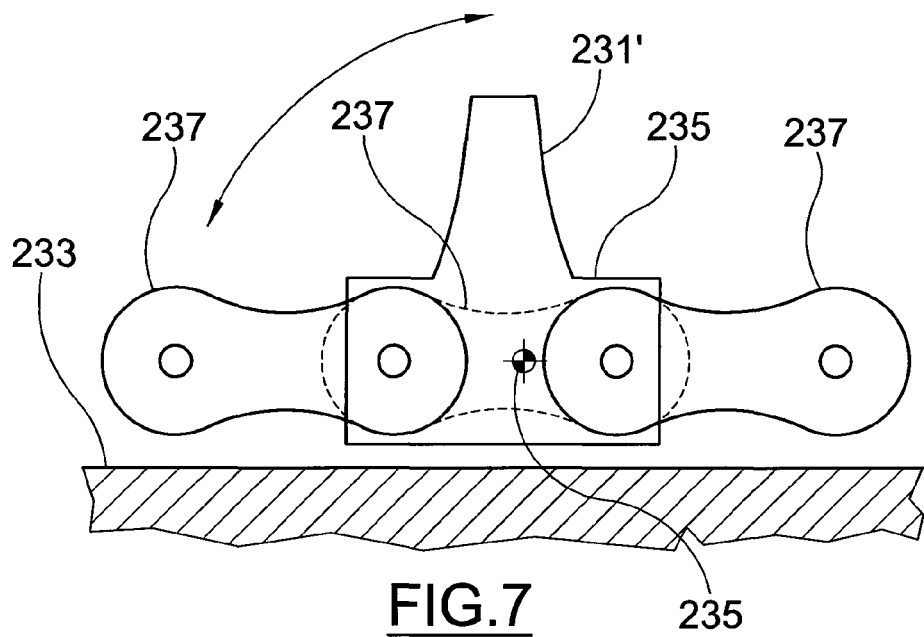
Figure 8:
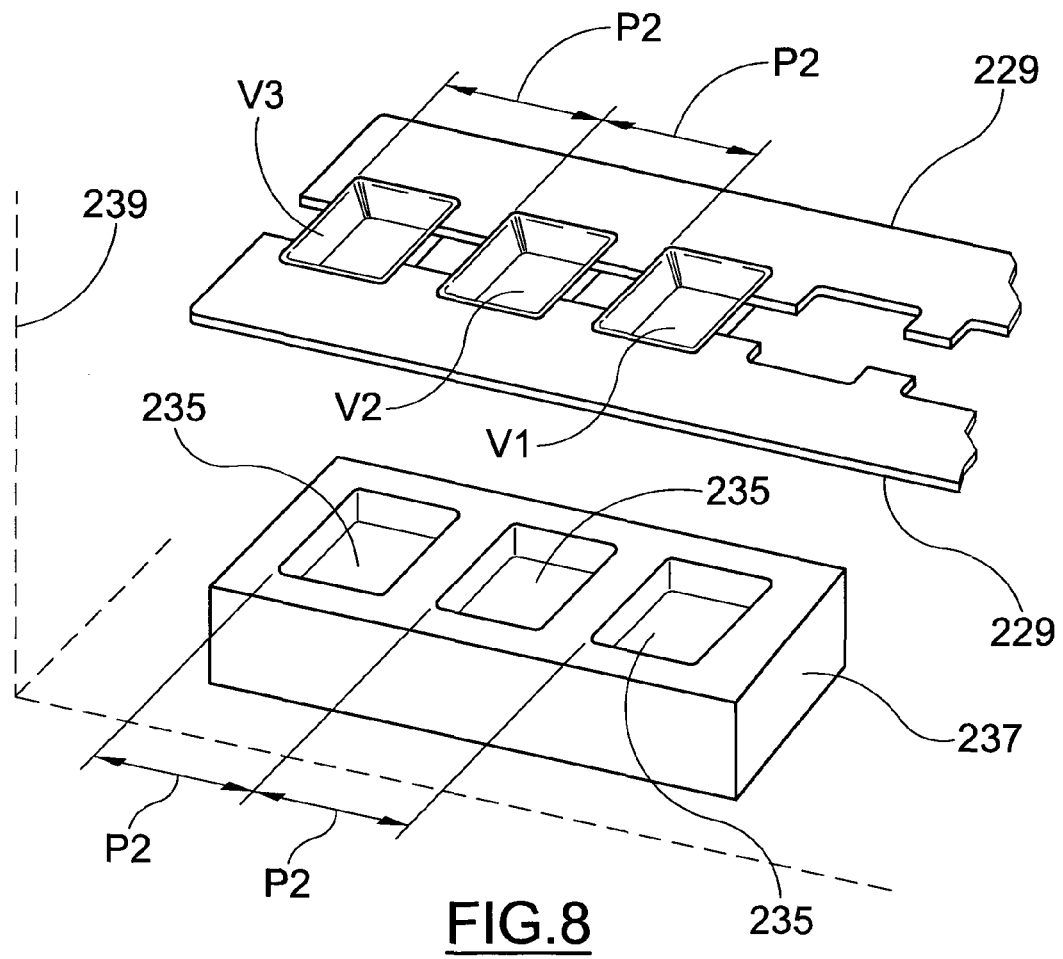

FIGS. 3 and 4 respectively show a side view and a perspective view of the slide and of one of the second conveyor chains of the feeder and positioner of FIG. 2;

FIGS. 5A-5D show four moments of an operative sequence of the feeder and positioner of FIG. 2;

FIG. 6 shows a side view of a flight with fixed tooth of the chain of FIGS. 2 and 3;

FIG. 7 shows a side view of a flight with moving tooth of a conveyor chain of a feeder and positioner according to a second embodiment of the present invention;

FIG. 8 shows a perspective view of a sealing unit which can be fed with the feeder and positioner of FIG. 2.

DETAILED DESCRIPTION

FIGS. 2-6, 8 are relative to a feeding and positioning system for discrete products according to a particular embodiment of the present invention. This system, indicated with the overall reference 200, comprises an upstream endless conveyor 201, in turn comprising two conveyor chains 203, arranged substantially horizontal, parallel and operated synchronously to each other, for example through coaxial pinions. At the downstream end thereof, each chain 203 is returned upstream wound around a pinion or pulley 207, which can be operated by an appropriate motor or be idle.

Located downstream of the upstream conveyor 201 is a downstream conveyor 209, comprising two second conveyor chains 211, also arranged substantially horizontal, parallel and, for example, operated synchronously to each other, for example so that they wind around the pinions or pulleys 207. A plurality of "flights" 205 is mounted on each of the chains 203, 211. Preferably the conveyor chains 211 in parallel on the downstream conveyor 209 are at least two.

FIG. 3 shows a side view of the path of one of the second chains 211: each chain 211, endless, engages with a plurality of pinions or—pulleys 207, 213, 215, 217, 219 and is diverted or returned thereby; in particular, in the downstream portion of its circuit, and of the surface on which the trays V to be conveyed rest, it winds around and engages with a first moving pulley or pinion 213; further upstream, and under the surface on which the trays V rest, each chain 211 engages with and winds around a second moving pulley or pinion 215. While during normal operation the pinions or pulleys 207, 217, 219 are fixed with respect to the casing 221, according to one aspect of the invention, the moving pulleys or pinions 213, 215 are mounted on a slide 223 (FIGS. 3, 4) designed to move forwards and backwards horizontally, consequently moving the first pulley or pinion 213 forwards or backwards without substantially modifying the pull of the chains 211. The slide 223 is operated by a suitable actuator, such as an electric motor that operates a belt.

In the horizontal upper section thereof, each chain 203, 211 runs substantially in the middle of and flush with one or more longitudinal bars respectively 225, 227 (FIGS. 2-4) so as to substantially form an upstream floor—formed by the assembly of bars 225—and a downstream floor—formed by the assembly of bars 227. The position of the chains 203, 211 is such that the flights 205 project above and outside the upstream and downstream floors and, when a tray V is resting on the bars 225, 227 it can engage and be pushed forward by the flights 205.

As shown in FIGS. 2, 3 the downstream bars 227 extend downstream beyond the first moving pulleys or pinions 213 so as to form, with their downstream ends, a "pick-up" area 241. In the present embodiment, two moving jaws 229 are arranged in the pick-up area 241 (FIGS. 2, 5A-5D).

Operation of the aforesaid feeding and positioning system is now described.

A plurality of trays V is moved from upstream towards downstream running on the longitudinal bars 225 of the upstream conveyor 201; each tray V is pushed by a flight 205 of the chains 203, and the trays are arranged in series with a first pitch P1, substantially equal to or in any case no greater than the distance between two consecutive flights 205 on the chains 203 (FIG. 2). At the start of the positioning cycle, the slide 223 is extended forward.

After reaching the pulleys or pinions 207, the trays pass onto the downstream chains 211 and—as the chains 203 and 221 engage with the same pulleys or pinions 207 and are synchronous, and the flights 205 on the chains 203 and 211 are arranged with the same pitch P1—they continue to advance sliding on the bars 227 substantially at the same speed at which they advance on the upstream conveyor 201.

Figure 5A:
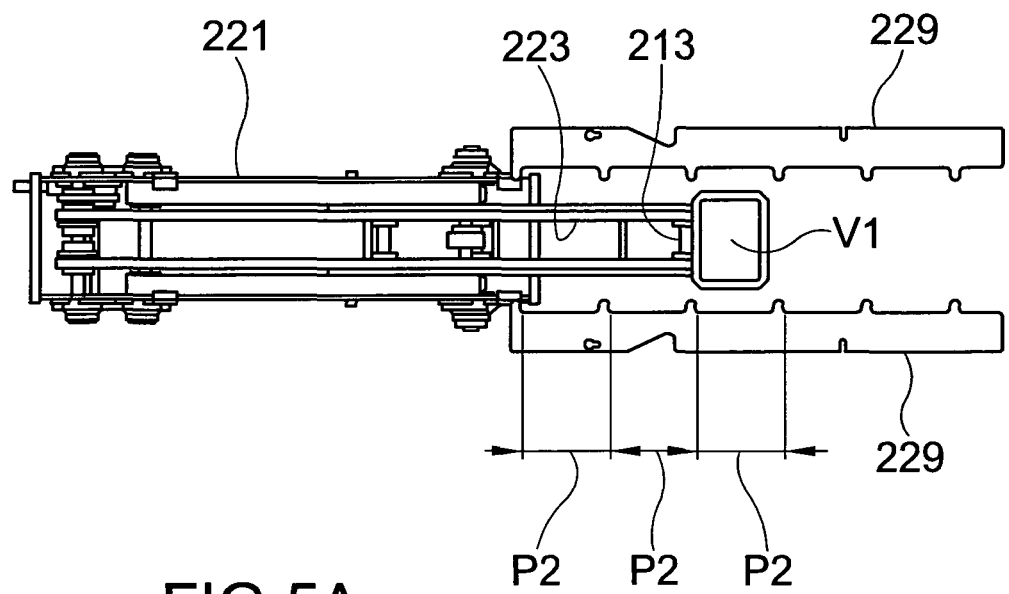

After reaching the first moving pulleys or pinions 213, a predetermined tray V1 disengages from the flights 205 which rotate downwards around the pulleys or pinions 213, and stops in the pick-up area 241, in the position shown in FIG. 5A, resting on top of the bars 227.

Figure 5B:
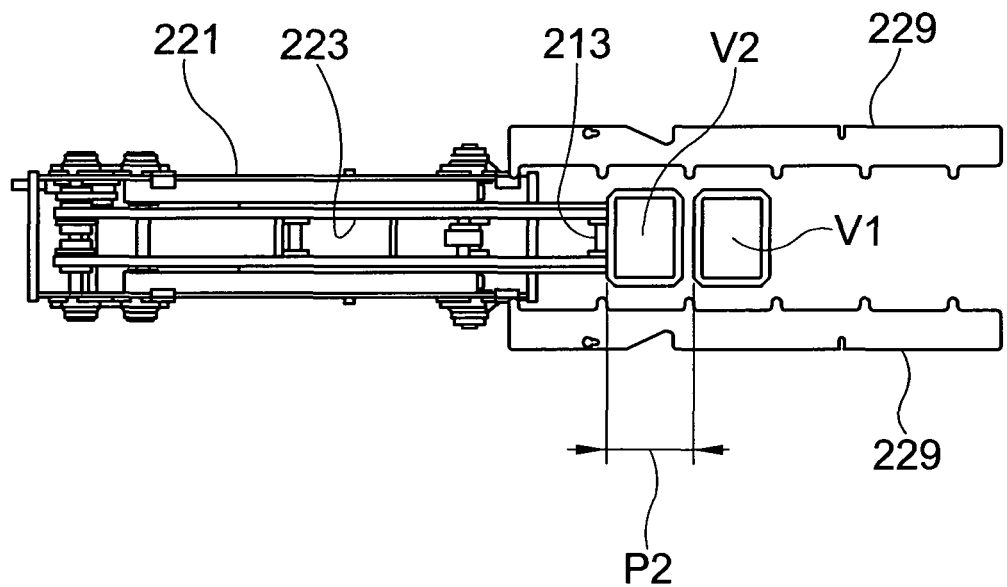

Before the subsequent tray V2 reaches or moves beyond the first moving pulleys or pinions 213, the slide 223 runs backwards by a pitch P2 which is advantageously less than the aforesaid pitch P1 (FIG. 5B). Then, the second tray V2 reaches the first moving pulleys or pinions 213 and stops in the pick-up area 241, behind the tray V1 in the position shown in FIG. 5B.

Figure 5C:
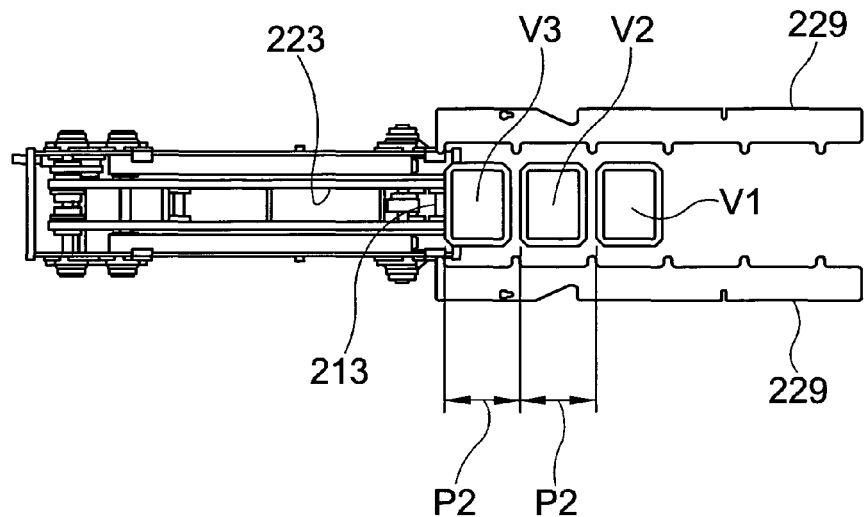
Figure 5D:
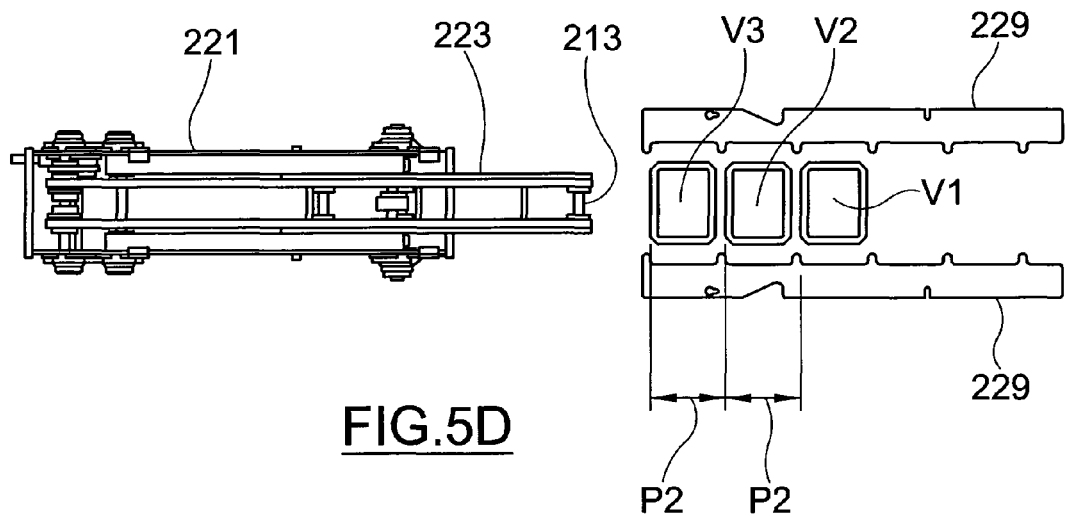

Analogously, before the subsequent tray V3 reaches or moves beyond the first moving pulleys or pinions 213, the slide 223 runs backwards by another pitch P2 and the tray V3 is released from the flights 205 behind the tray V2 in the position shown in FIG. 5C. As can be seen, the three trays V1, V2, V3 wait in the pick-up area 241 closer to one another than they were on the endless conveyors 201 and 209.

Now if only three trays at a time are to be loaded, for example, into a sealing unit 239, the jaws 229 pick up the trays V1, V2, V3 and deposit them simultaneously in the respective shells 235 of the open sealing moulds 237 of the sealing unit 239 (FIG. 8).

The feeding and positioning cycle described above is then repeated: the slide 223 can return to the initial forward extended position of FIG. 5A and, advantageously, new trays can continue to accumulate on the downstream portion of the bars 227 even if the jaws 229 are at a distance from the pick-up area 241.

Figure 1:
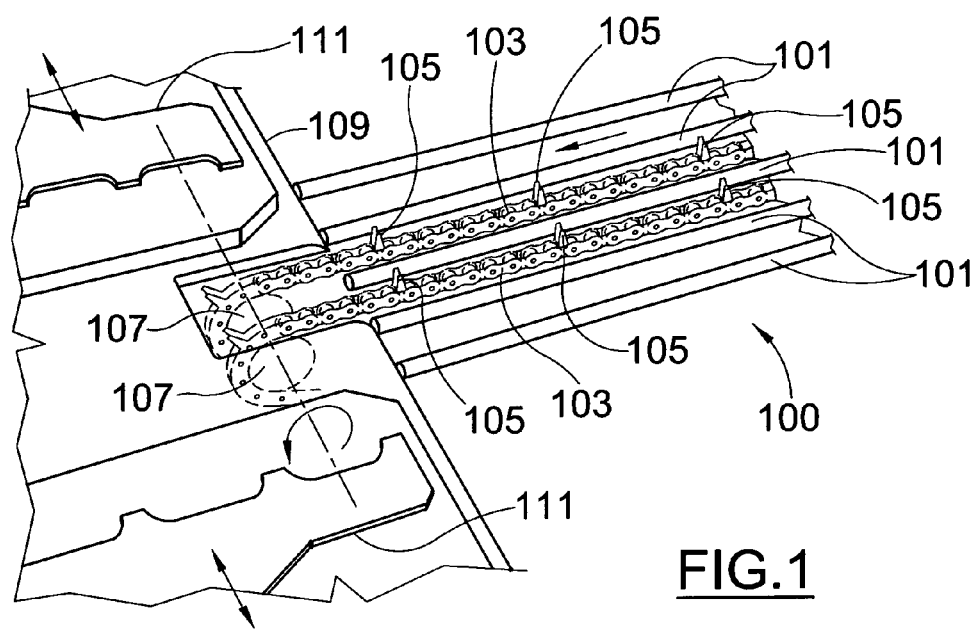
FIG. 1 shows a perspective view of a continuous feeding system of a known type.

Clearly, the feeding and pick-up cycle described above can be varied without difficulty, so as to simultaneously pick up an arbitrary number N of trays even greater than three, for example four, five or even more trays each time; more in particular, it is possible and easy to pick up, from the pick-up area 241, an arbitrary number of trays arranged in a row substantially and at least according to the direction they are fed to the area 241 from upstream, simply by reprogramming the number of stepped movements of the slide 223 and if necessary replacing the jaws 229. Therefore, as a result of the present invention, unlike the prior art system of FIG. 1, it is possible to simultaneously and easily load an arbitrary number of trays or other discrete products each time, positioning them in one or more rows in a pick-up area closer together than they were while being conveyed on the endless conveyors upstream, and making these and all the conveyors operate without having recourse to endless conveyors that alternate phases of movement with stops.

It has been found that, with the same number N of trays picked up and/or grasped simultaneously by the moving jaws 229, with the present invention it is possible to obtain a feeding and positioning speed even double that of the feeding and pick-up system described in the aforesaid European patent no EP1577216A1, simultaneously achieving greater simplicity and more compact construction, greater sturdiness and easier cleaning and sanitization (as the chains 211 are used in place of conveyor belts); it should be noted that in the loader and positioner described in the European application no EP1577216A1 the presence of liquid or solid residues of the food product to be packaged, present on the conveyor belts (or mats) can considerably compromise the stability of the trays and consequently correct positioning thereof.

The feeder and positioner 209 can easily be used to position trays for food products V1-V3 or other discrete products of variable dimensions: in fact, it is sufficient to vary the moving pitch P2 of the slide 223 and of the first moving pulleys or pinions 213, for example simply by reprogramming the motor or other actuator which operates the slide 223. The feeder and positioner 209 is also capable of positioning the trays V in the pick-up area 241 with great precision, for example as a result of the positioning precision of the slide 223 and to the fact that chains with flights or other relatively rigid and articulate mechanical components are used as driving elements, instead of conveyor belts or mats in synthetic and deformable material.

As a result of the present invention, for example as in the feeder and positioner 209, it is possible to eliminate buffers and other accumulation systems for the trays upstream of the pick-up area 241.

The examples of embodiment previously described are susceptible to various modifications and variations without departing from the scope of protection of the present invention. For example, a feeding and positioning system according to the invention can be adapted to manipulate not only trays for food products, but also other types of discrete products or articles, and to feed not only sealing units but any other device downstream. The first moving pulleys or pinions 213 can be substituted by other types of disengaging elements, such as curved guides and cam profiles, diverters, etc., designed to divert the path of the second conveyor chains 211, and these latter can be substituted with other types of endless driving elements, articulated or flexible, such as with conveyor strips, belts, chains without flights. The downstream 201 and upstream 209 endless conveyors can be produced not only as chain conveyors but also as belt conveyors, conveyors without flights and yet other types of conveyors; the chains or other articulated and relatively rigid mechanical elements in any case allow greater positioning precisions and easier cleaning and sanitization. For the present invention it is possible not only to use fixed flights, such as the one shown by way of example in FIG. 6, i.e. in which the tooth or teeth 231 have a fixed position and/or inclination with respect to the axis AC of the chain, but also moving flights, known per se and shown in FIG. 7, in which the tooth or teeth 231 have a variable position and/or inclination with respect to the axis AC.

In the moving flight of FIG. 7, the tooth 231' is integral with the block 235, which is hinged through a pin 235 to a link 237 of the chain; the pin 237 or other type of hinging allows the tooth 231' to rotate freely with respect to the chain link 237.

Inclination of the tooth 231' with respect to the axis of the chain can be determined, for example, through bodies adjacent to the chain, for example through the wall 233 of FIG. 7, cam profiles or yet other mechanisms.

The examples and lists of possible variants of the present application are intended as non-limiting lists.

The invention claimed is:

1. A feeder and positioner for discrete products (209), comprising:
   at least one conveyor guide (227);
   at least one first endless driving element (211) which in an upstream section is substantially side-by-side with the at least one conveyor guide, and is arranged to engage with a plurality of discrete products, conveyed sequentially, composed of upstream and downstream discrete products and make them advance along the at least one conveyor guide (227) toward a pick up area; and wherein:
   at a disengaging element (213) the at least one first endless driving element (211) is substantially diverted from the path of the at least one conveyor guide (227) so as to disengage from the plurality of discrete products;
   the feeder and positioner (209) comprises a system for reversibly moving the disengaging element (213) along the at least one conveyor guide (227);
   a pick-up area (241) which in turn comprises a section of the at least one conveyor guide (227) which, when the disengaging element (213) has moved into its most upstream position, extends downstream of the disengaging element (213) for a length sufficient to allow a number N of the plurality of discrete products to be accumulated, wherein N is greater than three, without the upstream discrete products which subsequently reach the pick-up area (241) moving downstream discrete products in the pick-up area downstream.

2. The feeder and positioner (209) according to claim 1, arranged to allow the plurality of discrete products to advance along the at least one conveyor guide (117) when resting on said guide.

3. The feeder and positioner (209) according to claim 1, wherein the disengaging element comprises one or more of the following components:
   at least one first moving pulley or pinion (213) which diverts the path of the at least a first endless driving element (211);
   a curved guide or cam profile;
   wherein the at least one first moving pulley or pinion (213), the curved guide or cam profile' are arranged to reversibly move with respect to the at least one conveyor guide (227).

4. The feeder and positioner (209) according to claim 3, wherein the system comprises a slide (223) arranged to move reversibly with respect to the at least one conveyor guide (227), and wherein the disengaging element (213) is mounted on the slide (223).

5. The feeder and positioner (209) according to claim 1, wherein:
   the at least one first endless driving element (211) is arranged to make the plurality of discrete products arranged in series with a pitch no greater than a first maximum predetermined pitch (P1);
   the system for reversibly moving the disengaging element (213) along the at least one conveyor guide (227) with one or more predetermined pitches (P2) substantially less than the first maximum predetermined pitch (P1).

6. The feeder and positioner (209) according to claim 1, arranged to perform the following operations in sequence:
   conveying a first discrete product to the pick-up area (241);
   repeatedly moving for M times the disengaging element (223) along the at least one conveyor guide (227) so as to arrange M subsequent discrete products in the pick-up area (241) in a row wherein downstream discrete products are already waiting in the pick-up area (241);
   simultaneously picking up the M+1 subsequent discrete products, removing them from the pick-up area (241), wherein M is an integer greater than one.

7. The feeder and positioner (209) according to claim 1, wherein the first endless driving element (211) comprises a chain or a conveyor belt.

8. The feeder and positioner (209) according to claim 1, defining a runway arranged to allow the plurality of discrete products (V) to move along therealong, and wherein the at least one conveyor guide comprises one or more bars (227) or tracks which extend along the runway.

9. The feeder and positioner (209) according to claim 1, wherein the at least one first endless driving element (211) is provided with a flight, a tooth, a hook, or a mechanical stop.

10. A system for sealing containers, comprising:
    a sealing unit (239) comprising a sealing mould (237) with several shells (235) arranged to receive a container in each shell (235);
    a feeder and positioner (209) having the features according to claim 1 and arranged to convey a plurality of containers to the sealing mould; and wherein:

the at least one first endless driving element (211) is designed to make the plurality of discrete products arranged in series by a pitch no greater than a first maximum pitch (P1);

at least along the direction of advance of the downstream section of the at least one first endless driving element (211), the shells (235) are arranged in series by a pitch substantially smaller than the first maximum pitch (P1);

one or more moving jaws (229) arranged to simultaneously grasp a number N of discrete products and transfer them from the pick-up area (241) to the sealing mould (237), wherein N is greater than three.

11. The system for sealing containers according to claim 10, comprising an endless conveyor (201) arranged so as to feed the feeder and positioner (209) with a plurality of discrete products, wherein:

the endless conveyor (201) is provided with a second endless driving element (203) designed to make the plurality of discrete products advance;

the first (211) and the second endless driving element (203) are arranged to make the plurality of discrete products advance substantially at the same speed and with a substantially continuous and not intermittent movement.

12. A feeder and positioner for discrete products (209), comprising:

at least one conveyor guide (227);

at least one first endless driving element (211) which in an upstream section is substantially side-by-side with the at least one conveyor guide, and is arranged to engage with a plurality of discrete products and make them advance along the at least one conveyor guide (227); and wherein:

at a disengaging element (213) the at least one first endless driving element (211) is substantially diverted from the path of the at least one conveyor guide (227) so as to disengage from the plurality of discrete products;

a system arranged to reversibly move the disengaging element (213) along the at least one conveyor guide (227);

a pick-up area (241) which in turn comprises a section of the at least one conveyor guide (227) which, when the disengaging element (213) has moved into its most upstream position, extends downstream of the disengaging element (213) for a length sufficient to allow a number N of discrete products to be accumulated, wherein N is greater than three, whereby the feeder and positioner (209) is arranged to perform the following operations in sequence:

conveying a first discrete product (V1) to the pick-up area (241);

repeatedly moving for M times the disengaging element (213) along the at least one conveyor guide (227) so as to arrange M further discrete products in the pick-up area (241) in a row wherein the discrete products are already waiting in the pick-up area (241);

simultaneously picking up the M+1 discrete products, removing them from the pick-up area (241), wherein M is an integer greater than one.

13. A feeder and positioner for discrete products (209), comprising:

at least one conveyor guide (227);

at least one first endless driving element (211) which in an upstream section is substantially side-by-side with the at least one conveyor guide, and is arranged to engage with a plurality of discrete products and make them advance along the at least one conveyor guide (227); and wherein:

at a disengaging element (213) the at least one first endless driving element (211) is substantially diverted from the path of the at least one conveyor guide (227) so as to disengage from the plurality of discrete products;

the feeder and positioner (209) comprises a system arranged to reversibly move the disengaging element (213) along the at least one conveyor guide (227);

the at least one first endless driving element (211) is arranged to make the plurality of discrete products arranged in series with a pitch no greater than a first maximum predetermined pitch (P1);

the system is arranged to move the disengaging element (213) along the at least one conveyor guide (227) with one or more predetermined pitches (P2) substantially less than the first maximum predetermined pitch (P1).

14. A feeder and positioner for discrete products (209), comprising:

at least one conveyor guide (227);

at least one first endless driving element (211) which in an upstream section is substantially side-by-side with the at least one conveyor guide, and is arranged to engage with a plurality of discrete products and make them advance along the at least one conveyor guide (227); and wherein:

at a disengaging element (213) the at least one first endless driving element (211) is substantially diverted from the path of the at least one conveyor guide (227) so as to disengage from the plurality of discrete products;

the feeder and positioner (209) comprises a system for reversibly moving the disengaging element (213) along the at least one conveyor guide (227);

a pick-up area (241) which in turn comprises a section of the at least one conveyor guide (227) which, when the disengaging element (213) has moved into its most upstream position, extends downstream of the disengaging element (213) for a length sufficient to allow a number N of discrete products to be accumulated, wherein N is greater than three, wherein:

the at least one first endless driving element (211) is arranged to make the plurality of discrete products arranged in series with a pitch no greater than a first maximum predetermined pitch (P1);

the system for reversibly moving the disengaging element (213) along the at least one conveyor guide (227) with one or more predetermined pitches (P2) substantially less than the first maximum predetermined pitch (P1).

* * * * *